United States Patent
Sixtensson et al.

(10) Patent No.: US 10,837,855 B2
(45) Date of Patent: Nov. 17, 2020

(54) PRESSURE MEASURING SYSTEM

(71) Applicant: Endress+Hauser GmbH+Co. KG, Maulburg (DE)

(72) Inventors: Daniel Sixtensson, Potsdam (DE); Fred Haker, Kleinmachnow (DE); Dennis Müller, Groß Kreutz (DE); Andreas Guth, Stahnsdorf (DE); Rene Ziermann, Kleinmachnow (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 287 days.

(21) Appl. No.: 15/769,512

(22) PCT Filed: Sep. 12, 2016

(86) PCT No.: PCT/EP2016/071395
§ 371 (c)(1),
(2) Date: Apr. 19, 2018

(87) PCT Pub. No.: WO2017/067707
PCT Pub. Date: Apr. 27, 2017

(65) Prior Publication Data
US 2018/0313711 A1 Nov. 1, 2018

(30) Foreign Application Priority Data
Oct. 19, 2015 (DE) .................... 10 2015 117 736

(51) Int. Cl.
*G01L 19/04* (2006.01)
*G01L 19/14* (2006.01)

(52) U.S. Cl.
CPC ............ *G01L 19/145* (2013.01); *G01L 19/04* (2013.01)

(58) Field of Classification Search
CPC .............................. G01L 19/04; G01L 19/145
See application file for complete search history.

(56) References Cited

U.S. PATENT DOCUMENTS 4,499,774 A * 2/1985 Tsuchiya ............... G01L 19/147
228/262.3
4,930,929 A * 6/1990 Maglic ...................... F16B 1/00
403/29

(Continued)

FOREIGN PATENT DOCUMENTS

CN 1664526 A 9/2005
CN 102472680 A 5/2012

(Continued)

OTHER PUBLICATIONS

Search Report for German Patent Application No. 10 2015 117 736.6, German Patent Office, dated Jul. 15, 2016, 6 pp.

(Continued)

*Primary Examiner* — David J Bolduc
(74) *Attorney, Agent, or Firm* — Christopher R. Powers; Endress+Hauser (USA) Holding Inc.

(57) ABSTRACT

Disclosed is an easily manufacturable pressure measuring system comprising a support, especially a support of metal, especially stainless steel, a pedestal connected with the support, and a pressure sensor mounted on a free end of the pedestal, in the case of which the pressure sensor is protected against thermomechanical stresses. The pressure measuring system is distinguished by features including that the pedestal includes a base arranged on the support, the pedestal includes a projection extending from the base toward the pressure sensor and comprising the free end of the pedestal, the base has a footprint, which is larger than a footprint of the projection, and the projection has a footprint, which is smaller than a footprint of the pressure sensor mounted thereon.

21 Claims, 2 Drawing Sheets

(56) References Cited

U.S. PATENT DOCUMENTS

| | | | | |
|---|---|---|---|---|
| 5,049,421 | A | 9/1991 | Kosh | |
| 5,635,649 | A * | 6/1997 | Tobita | G01L 19/0084 73/708 |
| 6,003,381 | A * | 12/1999 | Kato | G01L 19/146 73/721 |
| 6,127,713 | A * | 10/2000 | Takeuchi | G01L 19/147 257/419 |
| 6,768,196 | B2 * | 7/2004 | Harney | B81B 7/0048 257/729 |
| 7,166,911 | B2 * | 1/2007 | Karpman | B81B 7/0048 257/669 |
| 7,661,318 | B2 * | 2/2010 | Brosh | G01L 19/146 73/715 |
| 2004/0255683 | A1 * | 12/2004 | Barron | G01L 9/0052 73/719 |
| 2006/0213276 | A1 | 9/2006 | Ueyanagi et al. | |
| 2008/0006092 | A1 * | 1/2008 | Brida | G01L 19/146 73/715 |
| 2011/0303023 | A1 * | 12/2011 | Becher | G01L 19/0046 73/862.581 |
| 2012/0240683 | A1 * | 9/2012 | Ooya | G01L 19/04 73/706 |
| 2014/0076057 | A1 * | 3/2014 | Slakhorst | G01L 19/148 73/715 |
| 2014/0076059 | A1 * | 3/2014 | Hop | G01L 19/04 73/756 |
| 2015/0260596 | A1 * | 9/2015 | Lemke | G01L 9/0042 73/727 |
| 2015/0330854 | A1 * | 11/2015 | Tsushima | G01L 19/142 73/717 |
| 2015/0362391 | A1 * | 12/2015 | Suzuki | G01L 9/0044 137/511 |
| 2017/0205303 | A1 * | 7/2017 | Sanden | G01L 13/06 |
| 2017/0334713 | A1 * | 11/2017 | Golden | G01L 13/025 |
| 2017/0350783 | A1 * | 12/2017 | Sixtensson | G01L 19/145 |

FOREIGN PATENT DOCUMENTS

| | | |
|---|---|---|
| CN | 103674408 A | 3/2014 |
| DE | 3128188 A1 | 4/1982 |
| DE | 102007053859 A1 | 5/2009 |
| DE | 102009046692 A1 | 5/2011 |
| DE | 102014119396 A1 | 6/2016 |
| WO | 9405988 A1 | 3/1994 |
| WO | 2015059301 A1 | 4/2015 |

OTHER PUBLICATIONS

Search Report for International Patent Application No. PCT/EP2016/071395, WIPO, dated Dec. 20, 2016, 10 pp.

* cited by examiner

PRESSURE MEASURING SYSTEM

CROSS-REFERENCE TO RELATED APPLICATIONS

The present application is related to and claims the priority benefit of German Patent Application No. 10 2015 117 736.6, filed on Oct. 19, 2015 and International Patent Application No. PCT/EP2016/071395, filed on Sep. 12, 2016 the entire contents of which are incorporated herein by reference.

TECHNICAL FIELD

The invention relates to a pressure measuring system with a support, especially a support of metal, especially stainless steel, a pedestal connected with the support and a pressure sensor mounted on a free end of the pedestal.

BACKGROUND

Pressure measuring systems serve for metrological registering of pressures, especially absolute pressures, relative pressures and pressure differences, and are used in industrial measurements technology.

Frequently applied in pressure measuring technology are so called semiconductor pressure sensors. Semiconductor sensors are, in the present state of the art, regularly produced using silicon, e.g. by applying Silicon-on-Insulator (SOI) technology. They are embodied e.g. as pressure sensor chips, which typically have a membrane platform and a measuring membrane arranged on the membrane platform.

Such pressure sensors are very sensitive and are therefore, as a rule, inserted into a metal housing and supplied with the pressure to be measured via an interposed pressure transfer means filled with a pressure transmitting liquid. Housing and pressure sensor tend to be made of materials, which have very different coefficients of thermal expansion. Due to the mechanical connection between housing and pressure sensor required for assembly, thermomechanical stresses can occur, which affect the transfer behavior of the measuring membrane and thus degrade the achievable accuracy of measurement and its reproducibility. Especially of concern is a temperature dependent hysteresis of the measurement results.

For reducing temperature dependent stresses acting on the pressure sensor, DE 10 2007 052 364 A1 describes arranging the pressure sensor chip on a ceramic intermediate layer, which has a coefficient of thermal expansion matched to the coefficient of thermal expansion of the semiconductor material of the pressure sensor. The intermediate layer is adhered directly to a metal support of the housing via an adhesive bond executed with an elastic adhesive. Given as material for the support is Kovar. Kovar, which is a trade name nickel-cobalt ferrous alloy, has a coefficient of thermal expansion of 6 ppm/K and lies therewith clearly nearer to the coefficient of thermal expansion of 2.6 ppm/K of the silicon applied for pressure sensors than are more common and clearly more cost effective housing materials, such as e.g. stainless steel with a coefficient of thermal expansion of 16 ppm/K.

In the case of the described pressure measuring system, the ceramic intermediate layer has a footprint, which is larger than the footprint of the pressure sensor arranged thereon. This has the result that, in spite of the comparatively well matched coefficient of thermal expansion of the intermediate layer, thermomechanical stresses act on the pressure sensor over the entire base area of the pressure sensor.

As an alternative to this, known from the state of the art are complementary approaches, in the case of which a reduction of temperature dependent stresses acting on the pressure sensor is achieved by arranging the pressure sensor on a free end of a pedestal, whose footprint is clearly less than the footprint of the pressure sensor mounted thereon. For this, two different forms of embodiment are known, which are described e.g. in DE 34 36 440 A1. In the case of one form of embodiment, the pedestal is an integral component of the metal support of the housing and is composed of the material of the housing. In the case of the second form of embodiment, the pedestal is embodied as a separate rod- or tubular shaped component, which is held in a bore in the support by means of a glass bond. The glass bond offers the advantage that it effects an electrical insulation of the pressure sensor from the housing. However, the material combinations of pedestal- and support material, between which hermetically sealed glass bonds can be produced, are limited.

Moreover, described in the German patent application of the applicant filed Dec. 22, 2014 with the Application No. 10 2014 119396.2 is a pressure measuring system, which includes a pressure sensor mounted on a free end of a pedestal. Also in the case of this pressure measuring system, the pedestal is embodied as a separate rod- or tubular shaped component, whose footprint is less than the footprint of the pressure sensor mounted thereon. In contrast to the aforementioned state of the art, here the end of the pedestal facing away from the pressure sensor is adhered in a recess in a support by means of an adhesive bond. Adhesive bonds are clearly more elastic than rigid connections, such as, for example, glass bonds, and are, thus, much better able to lessen stresses occurring due to different coefficients of thermal expansion of support and pedestal. Moreover, adhesive bonds offer the advantage that they allow connection of a large multiplicity of material combinations of pedestal- and support material. In this way, an option is to use for the support a pressure resistant, more cost effective material, such as, for example, stainless steel, and to select the material of the pedestal from a large number of different materials as regards the special requirements of the pressure measuring system.

The smaller the footprint of the rod- or tubular shaped pedestal, the more difficult it is, however, to introduce the adhesive with sufficiently more exact metering into the correspondingly small recess. Moreover, the precise orientation of rod- or tubular shaped pedestal both in the case of the insertion into the recess, as well as also during the performance of the adhesive bonding, requires more care, the smaller the footprint of the pedestal is relative to its length.

SUMMARY

It is an object of the invention to provide a pressure measuring system having a pressure sensor, which is protected against thermomechanical stresses and which overcomes the aforementioned disadvantages.

To this end the invention resides in a pressure measuring system, comprising
 a support, especially a support of metal, especially stainless steel,
 a pedestal connected with the support, and
 a pressure sensor mounted on a free end of the pedestal, characterized in that the pedestal has a base arranged on the support, the pedestal has a projection, which extends from the base toward the pressure sensor and which comprises the free end of the pedestal, the base has a footprint, which is larger than a footprint of the projection, and the footprint of the projection is smaller than a footprint of the pressure sensor mounted thereon.

A first embodiment provides that a face of the pedestal facing the support, especially a face of the base facing the support, or a face of a second projection of the pedestal, which faces the support and adjoins the base, is connected by means of a joint with a face of the support facing the pedestal, especially a floor of a recess in the support, and a face of the projection facing the pressure sensor is connected by means of a joint with a face of the pressure sensor facing the pedestal.

A preferred development of the first embodiment provides that at least one of the joints is an adhesive bond, especially both joints are adhesive bonds, especially of an epoxy resin based adhesive, a thermoplastic adhesive or a silicone adhesive, especially a silicone rubber based adhesive.

A second embodiment provides that the base is essentially disk- or washer shaped, has a height in the order of magnitude of 0.5 mm to 10 mm, and/or has an essentially circular footprint, whose outer diameter is greater than an outer diameter of the projection and is especially less than 10 mm, or has an essentially square or rectangular footprint, whose side lengths are greater than an outer diameter of the projection and especially less than 10 mm.

A third embodiment provides that the projection is tube- or rod-shaped, wherein the projection especially has a circular- or annular footprint, especially a footprint with an outer diameter in the range from 0.5 mm to 5 mm, and the projection has a free standing length, which is greater than or equal to a minimum length of a few tenths of millimeters, and especially lies in the order of magnitude of 0.5 mm.

A fourth embodiment provides that a pressure transfer line is provided, which extends through the support and through the pedestal, via which the pressure sensor is contactable with a pressure or a reference pressure, and which especially has an inner diameter in the range from 0.25 mm to 1 mm.

A first further development provides that the base is inserted in a recess in the support.

A second further development provides that the base has facing the support a face, which is connected by means of a joint with a face of the support facing the pedestal, especially a floor of a recess provided in the support, and a cavity is provided in the base of the pedestal located in its face facing the support and in the center of the pedestal and open toward the support, especially a cavity, which is dimensioned in such a manner that by it the face of the base facing the support and serving as joint area is reduced to a size required for achieving a sufficient seal and strength.

A further development of the second further development provides that the cavity has in an axial direction extending in parallel with the longitudinal axis of the projection a height of greater than or equal to 0.2 mm, especially a height in the range from 0.2 mm to 0.5 mm.

Another further development of the second further development provides that the pressure measuring system is embodied as an absolute pressure measuring system, wherein the cavity is either essentially disk shaped and has an outer diameter, which is less than or equal to half an outer diameter or a side-length of the base, or has an essentially square or rectangular base, whose side lengths are less than or equal to half an outer diameter or a side-length of the base, or a pressure transfer line is provided extending through the support and through the pedestal and the cavity is either essentially disk shaped and has an outer diameter, which is less than or equal to half the sum of the inner diameter of the pressure transfer line and the outer diameter or the side-length of the base, or has an essentially square or rectangular footprint, whose side lengths are less than or equal to half the sum of the inner diameter of the pressure transfer line and the outer diameter or the side-length of the base.

Another further development of the invention provides that a hollow space is provided, which surrounds a joint between the pedestal and the support outwardly on all sides, wherein the hollow space especially is formed such that an outer lateral surface of the base has a formation decreasing a cross sectional area of the base toward the support, especially the formation is a conically tapering formation.

A third further development provides that the pedestal includes on its side facing away from the pressure sensor a second projection adjoining the base, a recess for accommodating the second projection is provided in the support, the base lies on a shoulder of the support adjoining the recess for accommodating the second projection, and pedestal and support are connected together via a joint provided between the face of the second projection facing away from the pressure sensor and toward the support (5) and the floor of the recess accommodating the second projection and facing toward the pressure sensor.

A fifth embodiment provides that the pedestal is composed of metal, especially stainless steel, Invar (which is a nickel-iron alloy known generically as FeNi36) or Kovar, of silicon carbide (SiC), or of an insulator, especially of ceramic, especially of aluminum oxide ($Al_2O_3$), silicon nitride (Si3N4) or aluminum nitride (AlN), or of glass, especially borosilicate glass.

A sixth embodiment provides that the pedestal is composed of a material, which has a coefficient of thermal expansion matched to the coefficient of thermal expansion of the pressure sensor.

A fourth further development provides that the pressure measuring system is a pressure difference measuring system or an absolute- or relative pressure measuring system for measuring higher pressures, especially pressures of greater than or equal to 40 bar, and the pedestal is composed of a material, especially stainless steel, Inver, Kovar or ceramic, especially of aluminum oxide ($Al_2O_3$), silicon nitride ($Si_3N_4$), silicon carbide (SiC) or aluminum nitride (AlN), which has a modulus of elasticity of greater than or equal to 200000 MPa.

The pressure measuring systems of the invention offer, supplementally to the advantages of the pressure measuring systems described in the above mentioned German patent application of the applicant filed on Dec. 22, 2014 with the Application No. 10 2014 119396.2, the advantage that the pedestals of the invention, due to the clearly greater footprint of the base, automatically orient in the case of their assembly and also automatically remain in this orientation during the manufacture of the joint between pedestal and support. The pedestal of the invention can, thus, be assembled with high precision in very simple manner.

BRIEF DESCRIPTION OF THE DRAWINGS

The invention and its advantages will now be explained in greater detail based on the figures of the drawing, in which three examples of embodiments are shown. Equal elements are provided in the figures with equal reference characters. The figures of the drawing show as follows.

DETAILED DESCRIPTION

Figure 1:
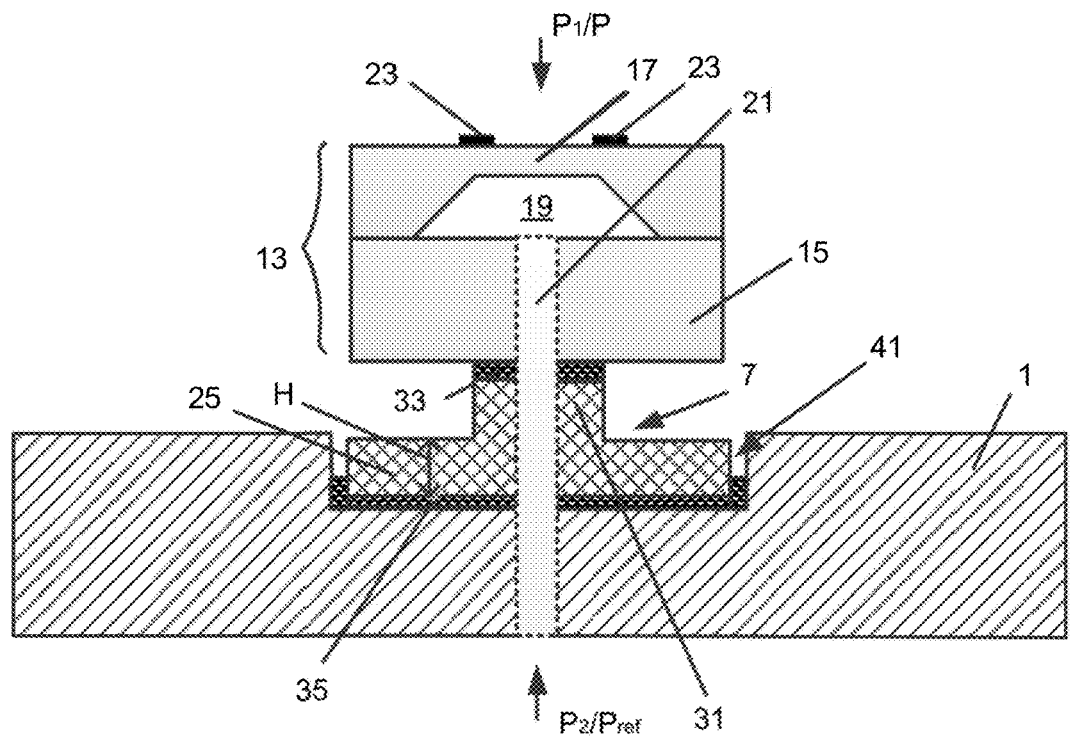
FIG. 1 shows a pressure measuring system of the invention.
Figure 2:
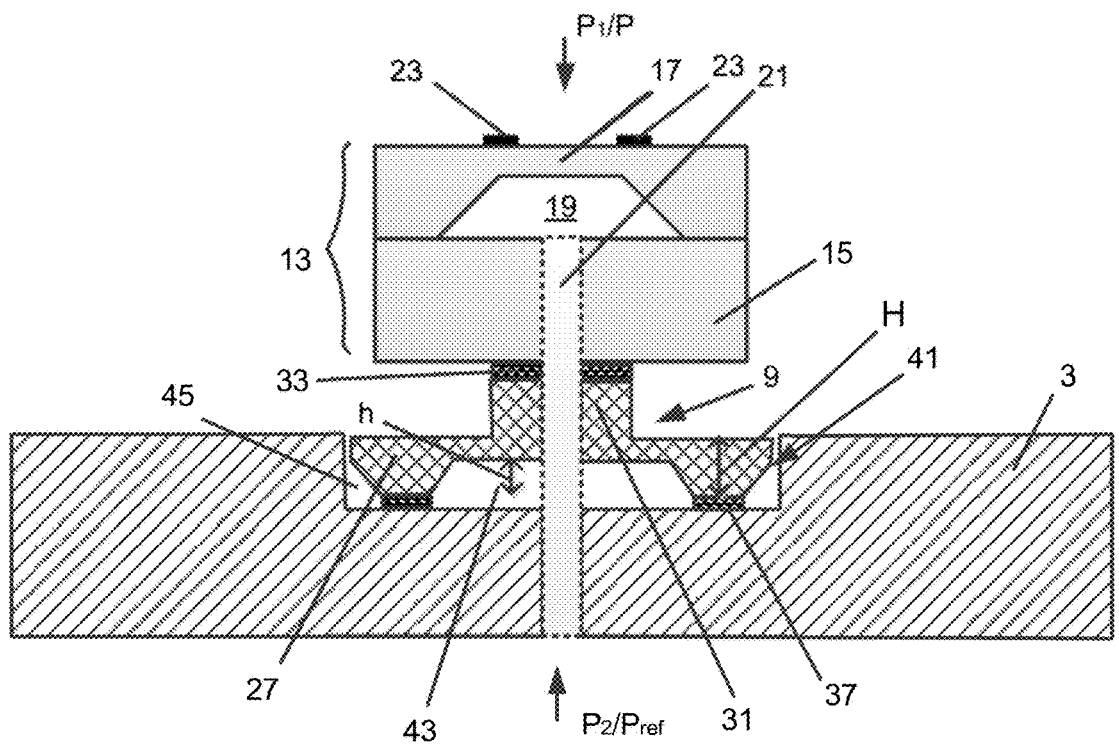
FIG. 2 shows a further development of the pressure measuring system of FIG. 1 with a cavity provided in the base.
Figure 3:
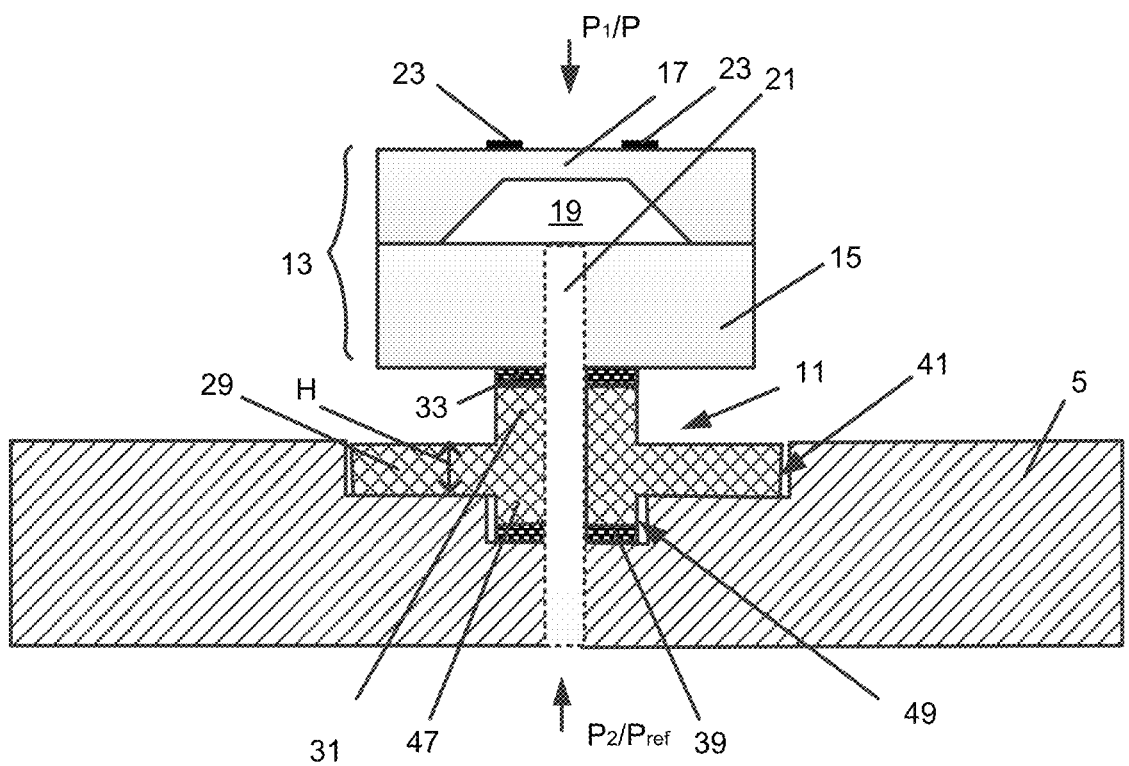
FIG. 3 shows a further development of the pressure measuring system of FIG. 1 with a second projection formed on the side of the base facing away from the pressure sensor.

FIGS. 1 to 3 show pressure measuring systems of the invention. All illustrated pressure measuring systems include a support 1, 3, 5, a pedestal 7, 9, 11 connected with the support 1, 3, 5 and a pressure sensor 13 mounted on a free end of the pedestal 7, 9, 11. Pressure sensors 13 are so-called semiconductor pressure sensors, e.g. using a pressure sensor chip manufactured from silicon, and include, for example, a membrane platform 15 and, arranged thereon, a measuring membrane 17, beneath which a pressure chamber 19 is enclosed.

The pressure measuring systems can be embodied as pressure difference-, relative pressure- or absolute pressure measuring systems.

For registering pressure differences, a first face of the measuring membrane 17 is supplied with a first pressure $p_1$ and the second face, via a pressure transfer line 21—shown dashed in FIG. 1—extending through the support 1, 3, 5, the pedestal 7, 9, 11, and the membrane platform 15, into the pressure chamber 19, with a second pressure $p_2$. In the case of this form of embodiment, the pressure difference between the first and second pressures $p_1$, $p_2$ acting on the measuring membrane 17 effects a deflection of the measuring membrane 17 dependent on the pressure difference $\Delta p$ to be measured.

For registering relative pressures, the first face of the measuring membrane 17 is supplied with the pressure p to be measured and the second face of the measuring membrane 17, instead of the second pressure $p_2$, is fed a reference pressure $p_{ref}$, e.g. an ambient pressure, with reference to which the pressure p acting on the first side is to be measured. In the case of this form of embodiment, the pressure difference between the pressure p and the reference pressure $p_{ref}$ acting on the measuring membrane 17 effects a deflection of the measuring membrane 17 dependent on the relative pressure to be measured.

Both in the case of the pressure measuring system formed as a pressure difference measuring system as well as also in the case formed as a relative pressure measuring system, the pressure transfer line 21 has preferably an inner diameter in the order of magnitude of 0.25 mm to 1 mm.

For registering absolute pressures, the pressure chamber 19 enclosed beneath the measuring membrane 17 is evacuated and completely outwardly sealed by the measuring membrane 17 and the membrane platform 15. In this case, the pressure transfer line 21 extending through the support 1, 3, 5, the pedestal 7, 9, 11, and the membrane platform 15, into the pressure chamber 19 is absent and the pressure p acting on the first side of the measuring membrane 17 effects a deflection of the measuring membrane 17 dependent on the absolute pressure to be measured.

The resulting deflection of the measuring membrane 17 is in all three cases registered by means of an electromechanical transducer and transduced into an electrical output signal, which then is available for further processing and/or evaluation. Applied as transducer can be e.g. a piezoresistive transducer, which includes sensor elements 23 arranged on or in the measuring membrane 17, e.g. piezoresistive elements connected together to form a resistance measurement bridge.

Pressure measuring systems of the inventions are distinguished by features including that their pedestals 7, 9, 11 comprise a base 25, 27, 29 arranged on the support 1, 3, 5 and a projection 31 extending from the base 25, 27, 29 toward the pressure sensor 13. In such case, the projection 31 includes the free end of the pedestal 7, 9, 11, on which the pressure sensor 13 is mounted.

For registering absolute pressures, the projection 31 is preferably rod-shaped, and the base 25, 27, 29 has an essentially disk-shaped geometry. For registering relative- or pressure differences, the projection 31 is preferably tubular and the base 25, 27, 29 has an essentially washer-shaped geometry.

The projection 31 of the pedestal 7, 9 11 includes, facing the pressure sensor 13, a face, which is connected by means of a joint 33 with a face of the pressure sensor 13 facing the pedestal 7, 9, 11.

The end of the projection 31 facing the pressure sensor 13 has a footprint, which is smaller than the footprint of the pressure sensor 13. Semiconductor pressure sensors have usually a square footprint, whose size, depending on measuring range and measuring sensitivity, lies in the order of magnitude of 1 mm² to 100 mm². In contrast, the projection 31 has preferably a circular- or annular footprint. The outer diameter of the projection 31 lies, depending on size of the footprint of the pressure sensor 13, preferably in the range from 0.5 mm to 5 mm. In the case of a rod-shaped projection 31, that corresponds to a footprint in the order of magnitude of about 0.2 mm² to 20 mm².

In such case, the rod- or tubular shaped projection 31 has preferably a free standing length, which is greater than or equal to a minimum length of a few tenths of millimeters. Thus, the projection 31 can have e.g. a length in the order of magnitude of 0.5 mm.

Via this geometry, especially the small footprint of the joint 33 relative to the footprint of the pressure sensor 13, a decoupling of measuring membrane 17 and support 1, 3, 5 is effected, which protects the pressure sensor 13 against thermomechanical stresses.

In the case of the pressure measuring systems of the invention, the base 25, 27, 29 has a footprint, which is greater, preferably significantly greater, than the footprint of the projection 31. If the base 25, 27, 29 is essentially circular disk or circular washer shaped, then it has an outer diameter, which is greater than the outer diameter of the projection 31 and is preferably less than 10 mm. If the base 25, 27, 29 has an essentially rectangular or square footprint, then its side lengths are correspondingly greater than the outer diameter of the projection 31 and preferably less than 10 mm. In such case, the base 25, 27, 29 has, in the case of the here illustrated, essentially disk or annular washer shaped geometry, a height H, which results from its disk thickness and which is preferably greater than or equal to 0.5 mm and less than or equal to 10 mm.

The pedestals 7, 9, 11 of the illustrated pressure measuring systems have, in each case, a face facing the support 1, 3, 5, which is connected by means of a joint 35, 37, 39 with a face of the support 1, 3, 5 facing the pedestal 7, 9, 11.

Fundamentally, both for manufacture of the joint 33 between pedestal 7, 9, 11 and pressure sensor 13 as well as also for manufacture of the joint 35, 37, 39 between pedestal 7, 9, 11 and support 1, 3, 5, joining methods known from microsystem technology can be applied, such as e.g. brazing methods, soldering methods or glass soldering methods.

Preferably, at least one of the two joints 33, 35, 37, 39 is an adhesive bond. In an especially preferred form of embodiment, both of the joints, 33 and 35, 37, 39, are adhesive bonds. Suited for manufacture of the adhesive bonds are especially adhesives based on epoxy resin, thermoplastic adhesives or silicone adhesives, such as, for example, silicone rubber based adhesives.

In the case of the pressure measuring systems of the invention, the very large footprint of the base 25, 27, 29 in comparison with the footprint of the projection 31, as well as the center of gravity of the pedestal 7, 9, 11 shifted by the base 25, 27, 29 toward the support 1, 3, 5, effect that the pedestal 7, 9, 11 in the case of the setting of the pedestal 7, 9, 11 on the support 1, 3, 5 automatically assumes an orientation, in the case of which the face of the base 25, 27, 29 facing the support 1, 3, 5 extends essentially in parallel with the face of the support 1, 3, 5, on which the base 25, 27, 29 is superimposed. This orientation remains stable also during the performance of a joint forming method used for manufacture of the joint 35, 37, 39 between pedestal 7, 9, 11 and support 1, 3, 5. Thus, neither during the introduction and bringing to rest of the pedestal 7, 9, 11, nor during the joining method are special measures required for orientation of the pedestal 7, 9, 11.

The pedestal 7, 9, 11 can be arranged on the support 1, 3, 5 manually or by machine. In the case of the arranging by machine, the comparatively large footprint of the base 25, 27, 29 offers the advantage that the pedestal 7, 9, 11 can be held more easily by vacuum exerted by an automatic populator and transported safely in the vacuum-held state and then set down into the desired location on the support 1, 3, 5.

Fundamentally, the base 25, 27, 29 of the pedestal 7, 9, 11 can be arranged directly on a planar external face of the support 1. Preferably, however, the support 1, 3, 5 has on its face facing the pressure sensor 13 a recess 41, into which the base 25, 27, 29 of the pedestal 7, 9, 11 is inserted.

The insertion of the base 25, 27, 29 into the recess 41 offers the advantage of an, overall, lower and more compact form of construction. The fact that the base 25, 27, 29 is arranged sunk in the support 1, 3, 5 means that an interior of a housing (not shown), into which the pressure sensor 13 mounted on the support 1, 3, 5 is introduced, can be clearly less than it would be, if it would also have to accommodate the base 25, 27, 29. In this way, also the volume of pressure transmitting liquid, via which the exterior of the measuring membrane 17 in the inner space of the housing is supplied with the pressure p to be measured, or the first pressure $p_1$, is lessened.

In the case of the example of an embodiment illustrated in FIG. 1, a floor of the recess 41 facing the pedestal 7 forms an inner face of the support 1, via which the support 1 is connected via the joint 35 with the face of the base 25 facing the support 1. In that case, the joint 35 extends between pedestal 7 and support 1 over the area of the face of the base 25 of the pedestal 7 facing the floor.

Due to the very large footprint of the base 25 in comparison with the footprint of the projection 31, there is available for joint 35 between pedestal 3 and support 1 in the case of the example of an embodiment illustrated in FIG. 1 a joint area on the pedestal side, which is clearly significantly greater than a minimum joint area required, depending on the choice of joining method, for achieving a sufficient seal and strength.

FIGS. 2 and 3 show two alternative pressure measuring systems of the invention, in the case of which the joint 37, 39 between pedestal 9, 11 and support 3, 5 extends over a smaller joint area.

The example of an embodiment shown in FIG. 2 differs from that illustrated in FIG. 1 in that a cavity 43 is provided in the base 27 of the pedestal 9 on its face facing the support 3 arranged in the center of the pedestal 9 and open toward the support 3.

Cavity 43 has preferably a height h measured in the axial direction—thus extending in parallel with the longitudinal axis of the projection 31. Depending on the height H of the base 27, the height h lies in the order of magnitude of 0.2 mm to 0.5 mm.

Cavity 43 is preferably essentially circular disk shaped. In the case of pressure measuring systems formed as absolute pressure measuring systems without pressure transfer line 21, it has preferably an outer diameter, which is less than or equal to half of the outer diameter, or side lengths, of the base 27. In contrast, in connection with pressure measuring systems with a pressure transfer line 21, it has preferably an outer diameter, which is less than or equal to half the sum of the inner diameter of the pressure transfer line 21 and the outer diameter, or the side-length, of the base 27.

Alternatively, cavity 43 can have an essentially square or rectangular footprint. In that case, its footprint has, in connection with pressure measuring systems formed as absolute pressure measuring systems without pressure transfer line 21, preferably side lengths, which are less than or equal to half of the outer diameter, or the side lengths, of the base 27. In contrast, it has, in connection with pressure measuring systems with pressure transfer line 21, preferably side lengths, which are less than or equal to half the sum of the inner diameter of the pressure transfer line 21 and the outer diameter, or the side-length, of the base 27.

Cavity 43 reduces the area of the base 27 serving as joint area. In such case, the footprint of the cavity 43 is preferably dimensioned in such a manner that the joint area is reduced by the cavity 43 to a size required for achieving a sufficient seal and strength. That offers the advantage that the joint area, over which thermomechanical stresses coming from different coefficients of thermal expansion of pedestal 9 and support 3 can be transmitted via the joint 37 to the pedestal 9, is reduced. The smaller the joint area, the lower are the thermomechanical stresses, which are transmitted via the joint area to the pedestal 9. The smaller the thermomechanical stresses transmitted to the pedestal 9, the lower also are their influence on the measuring characteristics of the pressure sensor 13.

In the examples of embodiments illustrated in FIGS. 1 and 2, the joint 35, 37 between pedestal 7, 9 and support 1, 3 extends, in each case, over the area of the base 25, 27 facing the floor of the cavity 43. The area of the pedestal 9 illustrated in FIG. 2 serving as joint area is, however, due to the cavity 43, significantly less than the area of the pedestal 7 illustrated in FIG. 1 serving as joint area.

In the case of the example of an embodiment illustrated in FIG. 1, the joint 35 between pedestal 7 and support 1, embodied preferably as an adhesive bond, extends supplementally over an external lateral surface of the base 25 located in the recess 41. This case can result e.g. from the fact that an adhesive, liquid during the processing, penetrates, especially due to capillary forces, into the gap between base 25 and support 1 externally surrounding the base 25.

In the case of the example of an embodiment illustrated in FIG. 2, the cavity 43 forms a hollow space adjoining the inner side of joint 37. This hollow space offers the advantage that it can accommodate excess adhesive. Excess adhesive can occur e.g. when mistakenly more adhesive than required is applied at the location to be bonded, or when adhesive applied on the bonding areas escapes from the intermediate space between the support 3 and the joint area of the base 27 before or during the bonding procedure. The accommodating of excess adhesive is especially advantageous in connection with pressure measuring systems for relative- or pressure difference measurement, since it assures, in such case, that no adhesive penetrates into the pressure transfer line 21.

Preferably, especially in connection with pedestals 7, 9 installed in a recess 41 in the support 1, 3, a further hollow space 45 is provided, which surrounds the joint 35, 37 between pedestal 7, 9 and support 1, 3 outwardly on all sides. This variant is shown in FIG. 2. There, the hollow space 45 is produced by tapering, especially conically tapering, of an outer lateral surface of the base 27 at least on its side facing the support 3 such that a cross sectional area of the base 27 decreases toward the support 3. This variant is naturally also applicable in connection with the example of an embodiment illustrated in FIG. 1.

In the case of the examples of embodiments illustrated in FIGS. 1 and 2, the size of the recess 41 matched to the size of the footprint of the base 25, 27 offers the advantage that there is then still very much space for the introduction of adhesives, even when the projection 31 carrying the pressure sensor 13 has only a comparatively small footprint. That facilitates not only the introduction of the adhesive into the recess 41, but also its metering.

The pressure measuring system of the invention shown in FIG. 3 differs from the examples of embodiments illustrated in FIGS. 1 and 2 in that the pedestal 11 has on its side facing away from the pressure sensor 13 a second projection 47 adjoining the base 29. Additionally, provided in the support 5 is a recess 49 adjoining the recess 41 for accommodating the base 29. Recess 49 serves for accommodating the second projection 47. Second projection 47 is, exactly such as the first projection 31, rod- or tubular shaped and has a footprint, which is less than the footprint of the base 29. Correspondingly, for accommodating the second projection 47, recess 49 has a footprint, which is less than the footprint of the recess 41 accommodating the base 29 in the support 5. In this way, there arises in the support 5 a shoulder, on which the face of the base 29 facing the support 5 lies. In the case of this form of embodiment, the joint 39 between pedestal 11 and support 5 is provided between the face of the second projection 47 facing away from the pressure sensor 13 and toward the support 5 and the floor of the recess 49 facing toward the pressure sensor 13 and accommodating the second projection 47.

Alternatively in this connection, base 29 can naturally also be arranged here on a face of the support facing the pressure sensor 13, in that the recess 41 for accommodating the base 29 is omitted and only the recess for accommodating the second projection is provided in the support 5. In that case, the face of the support bordering on the recess for accommodating the second projection 47 forms a shoulder, against which lies the face of the base 29 facing the support.

This form of embodiment offers, exactly as the form of embodiment shown in FIG. 2, the advantage of a smaller joint area of the joint 39 between support 5 and pedestal 11 in comparison with the example of an embodiment illustrated in FIG. 1. Moreover, it offers in the case of relative- and pressure difference measuring systems the advantage that the reference pressure $p_{ref}$ to be transferred to the pressure sensor 13 via the pressure transfer line 21, or the second pressure $p_2$ to be transferred to the pressure sensor 13 via the pressure transfer line 21, mechanically loads the joint 39 between pedestal 11 and support 5 to a significantly lesser degree than the in the case of the example of an embodiment illustrated in FIG. 2, where the cavity 43 is open to the pressure transfer line 21. In this way, measurement errors by mechanical loadings of joint 39 are reduced.

In the case of all illustrated examples of embodiments, adhesive bonded joints 33 and/or 35, 37, 39 offer the advantage that they are significantly more elastic than rigid connections, such as, for example, glass bonds, parent material bonded connections, brazes, solderings or welds, and, thus, are able to reduce stress occurring due to different coefficients of thermal expansion of support 1, 3, 5 and pedestal 7, 9, 11, and of pedestal 7, 9, 11 and pressure sensor 13. The adhesive bonds, thus, bring about a reduction of thermomechanical stresses, which would otherwise affect or be transmitted to the pressure sensor 13, especially its measuring membrane 17. In such case, the reduction of thermomechanical stresses effected by the adhesive bonds is greater, the more elastic the adhesive bonds are.

The strength and sealing of joints 33, 35, 37, 39 effected by adhesive bonds depend, on the one hand, on the choice of adhesive, and, on the other hand, on the adhering area available for the particular joint 33, 35, 37, 39. Correspondingly, the adhesive applied for manufacture of adhesive bonds is preferably selected as a function of the available area and the requirements for strength dependent on the pressure measuring range of the pressure measuring system. In such case, preferably one of the more elastic adhesives is applied, the greater the provided adhering area is and the lower the requirements for strength.

The strength of adhesive bonds is, as a rule, dependent on the temperature and the direction in which the adhesive bonds are loaded during operation. Insofar, loadings of the adhesive bonds directed from the support 1, 3, 5 toward the pressure sensor 13 require a higher strength of the adhesive than in the reverse direction from the pressure sensor 13 toward the support 1, 3, 5, since the latter are borne not only by the adhesives but also by the support 1, 3, 5.

In such case, the modulus of elasticity of the utilized adhesive in a particular loading direction forms a measure for the strength. Thus, for example, as a function of the dimensions of the components, the choice of material and the size of the adhering area in connection with pressure difference measuring systems of the invention or absolute- or relative pressure measuring systems of the invention, it can be advantageous for measuring higher pressures, especially pressures of greater than or equal to 40 bar, to use an adhesive with a modulus of elasticity of greater than or equal to 2000 MPa, especially a modulus of elasticity in the range from 2000 MPa to 10000 MPa. In contrast, for example, as a function of the dimensions of the components, the choice of material and the size of the adhering area in connection with absolute- or relative pressure measuring systems of the invention for measuring lower pressures, especially pressures of less than or equal to 40 bar, depending on size of the adhering area, it can be advantageous to use an adhesive with a modulus of elasticity of less than or equal to 2000 MPa, especially a modulus of elasticity in the range from 10 MPa to 1000 MPa, wherein in connection with absolute- or relative pressure measuring systems for measuring lower pressures, especially pressures of less than or equal to 40 bar, depending on size of the adhering area, even adhesives with a modulus of elasticity of less than or equal to 10 MPa can be advantageous.

If both the joint 33 between pressure sensor 13 and pedestal 7, 9, 11 as well as also the joint 35, 37, 39 between pedestal 7, 9, 11 and support 1, 3, 5 are embodied as adhesive bonds, then that offers the advantage that, by the cooperation of the two adhesive bonds, also a significant reduction of thermomechanical stresses is effected, when the two joints 33 and 35, 37, 39 are executed with an adhesive with a comparatively high modulus of elasticity.

Adhesive bonds offer the advantage that through them not only thermomechanical stresses are reduced, but also a large variety of different materials for pedestal 7, 9, 11 and support 1, 3, 5, and pedestal 7, 9, 11 and pressure sensor 13 can be connected together.

In such case, preferably applied for the support 1, 3, 5 as regards its pressure resistance is a material with a high modulus of elasticity, and, as regards its comparatively large volume, preferably a cost effective material, such as, for example, stainless steel.

The material of the pedestal 7, 9, 11 can then be selected from a large number of different materials as regards the special requirements for pressure measuring systems. Included are metals, especially stainless steel, Kovar or Inver, ceramics, especially aluminum oxide ($Al_2O_3$), silicon carbide (SiC), silicon nitride ($Si_3N_4$) or aluminum nitride (AlN), and glasses, especially borosilicate glass.

In such case, for measuring pressure differences or high absolute- or relative pressures, such as e.g. pressures of greater than or equal to 40 bar, preferably pedestals 7, 9, 11 of a material with high modulus of elasticity, especially a modulus of elasticity of greater than or equal to 200000 MPa are applied. By comparatively high modulus of elasticity, influences dependent on the pressure acting on the pedestal 7, 9, 11 on the achievable accuracy of measurement are largely prevented. Suited for this are especially pedestals 7, 9, 11 of stainless steel, Kovar, Invar or ceramic, e.g. aluminum oxide ($Al_2O_3$), silicon carbide (SiC), silicon nitride ($Si_3N_4$) or aluminum nitride (AlN). For measuring lower absolute- or relative pressures, such as e.g. pressures in the range of up to 40 bar, also materials with lesser modulus of elasticity, such as, for example, glass, can be applied.

Moreover, via the choice of an insulator as material for the pedestal 7, 9, 11, an electrical insulation of the pressure sensor 13 from the support 1, 3, 5 can be effected. An electrical insulation can, for example, be effected by a pedestal 7, 9, 11 of glass, e.g. borosilicate glass, or ceramic, e.g. aluminum oxide ($Al_2O_3$), silicon nitride ($Si_3N_4$) or aluminum nitride (AlN), wherein for measuring pressure differences or high absolute- or relative pressures, such as e.g. pressures greater than or equal to 40 bar, preferably ceramic is applied, since ceramic has a clearly higher modulus of elasticity than glasses.

In the case of pressure measuring systems, whose pressure sensors 13 have in any event a membrane platform 15 of an insulator, e.g. glass or ceramic, to be connected with the pedestal 7, 9, 11, such an insulation is not required.

For additional reduction of temperature dependent stresses affecting the pressure sensor 13, especially its measuring membrane 17, the pedestal 7, 9, 11 is composed preferably of a material, which has a coefficient of thermal expansion matched to the coefficient of thermal expansion of the pressure sensor 13. Referenced to the coefficient of thermal expansion of silicon of 2.6 ppm/K, suited for this are especially borosilicate glasses, which have a coefficient of thermal expansion in the order of magnitude of 3.2 ppm/K. In pressure measuring systems for measuring pressure differences or higher absolute- or relative pressures, however, preferably a material with higher modulus of elasticity is selected, such as, for example, Kovar with a coefficient of thermal expansion in the order of magnitude of 5 ppm/K, Invar with a coefficient of thermal expansion in the order of magnitude of 0.55 ppm/K, or ceramic, e.g. aluminum oxide ($Al_2O_3$) with a coefficient of thermal expansion in the order of magnitude of 8.5 ppm/K, silicon carbide (SiC) with a coefficient of thermal expansion in the order of magnitude of 3.5 ppm/K to 4.5 ppm/K, aluminum nitride (AlN) with a coefficient of thermal expansion in the order of magnitude of 4 ppm/K to 5 ppm/K or silicon nitride ($Si_3N_4$) with a coefficient of thermal expansion in the order of magnitude of 2.8 ppm/K to 2.9 ppm/K, selected.

The invention claimed is:

1. A pressure measuring system, comprising:
    a metal support;
    a pedestal including a base and a projection extending from the base and having a free end opposite the base, wherein the pedestal is connected to the support at the base; and
    a pressure sensor mounted on the free end of the projection,
    wherein the base of the pedestal has a footprint that is larger than a footprint of the free end of the projection, and wherein the footprint of the free end of the projection is smaller than a footprint of the pressure sensor mounted thereon.

2. The pressure measuring system of claim 1, wherein:
    the support includes a recess having a floor;
    a face of the base adjacent the support is connected via a joint with the floor of the recess in the support; and
    a face of the projection adjacent the pressure sensor is connected via a joint with a face of the pressure sensor adjacent the pedestal.

3. The pressure measuring system of claim 2, wherein at least one of the joint with the floor of the recess or the joint with the face of the pressure sensor is an adhesive bond using one of an epoxy resin-based adhesive, a thermoplastic adhesive or a silicone rubber-based adhesive.

4. The pressure measuring system of claim 2, wherein both the joint with the floor of the recess and the joint with the face of the pressure sensor are adhesive bonds using one of an epoxy resin-based adhesive, a thermoplastic adhesive or a silicone rubber-based adhesive.

5. The pressure measuring system of claim 1, wherein the base is substantially disk- or washer-shaped, having a height between about 0.5 mm to about 10 mm and/or having an substantially circular footprint with an outer diameter greater than an outer diameter of the projection but less than about 10 mm.

6. The pressure measuring system of claim 1, wherein the base is substantially square or rectangular with side lengths greater than an outer diameter of the projection and but less than about 10 mm.

7. The pressure measuring system of claim 1, wherein the projection is tube- or rod-shaped with an annular or circular footprint, respectively, the footprint having an outer diameter between 0.5 mm to 5 mm, and wherein the projection has a free standing length greater than or equal to 0.2 mm.

8. The pressure measuring system of claim 7, wherein the free standing length is greater than or equal to about 0.5 mm.

9. The pressure measuring system of claim 1, further comprising a pressure transfer line extending through the support and through the pedestal via which a pressure may be applied to the pressure sensor, the pressure transfer line having an inner diameter between 0.25 mm to 1 mm.

10. The pressure measuring system of claim 1, wherein the base is disposed in a recess in the support.

11. The pressure measuring system of claim 1, wherein:
the support includes a recess having a floor;
the base has a face adjacent the support that is connected via a joint with the floor of the recess in the support, the joint having a joint area;
the base includes a cavity in the face adjacent, and open toward, the support; and
the cavity is sized relative to the face adjacent the support such that the joint area is configured to affix the pedestal to the support with adequate seal and strength.

12. The pressure measuring system of claim 11, wherein the cavity has a height in a direction extending parallel with a longitudinal axis of the projection, the height greater than or equal to 0.2 mm.

13. The pressure measuring system of claim 11, wherein the cavity has a height in a direction extending parallel with a longitudinal axis of the projection, the height is between 0.2 mm to 0.5 mm.

14. The pressure measuring system of claim 11, wherein the cavity is substantially disk-shaped with an outer diameter that is less than or equal to half an outer diameter or a side length of the base, or the cavity has a substantially square or rectangular footprint with side lengths less than or equal to half the outer diameter or side length of the base, and wherein the pressure measuring system configured to measure absolute pressure.

15. The pressure measuring system of claim 11, further comprising a pressure transfer line extending through the support and through the pedestal via which a pressure may be applied to the pressure sensor, wherein the cavity is substantially disk-shaped with an outer diameter that is less than or equal to half a sum of an inner diameter of the pressure transfer line and an outer diameter or side length of the base, or the cavity has a substantially square or rectangular footprint with side lengths less than or equal to half the sum of the inner diameter of the pressure transfer line and the outer diameter or side length of the base.

16. The pressure measuring system of claim 1, wherein a hollow space surrounds a joint between the pedestal and the support outwardly on all sides, and wherein an outer lateral surface of the base is tapered toward the support yielding a decreasing cross-sectional area of the base.

17. The pressure measuring system of claim 10, wherein a hollow space surrounds a joint between the pedestal and the support outwardly on all sides, and wherein an outer lateral surface of the base is tapered toward the support yielding a decreasing cross-sectional area of the base.

18. The pressure measuring system of claim 1, wherein:
the pedestal includes a second projection extending from the base opposite the first projection and terminating in a second free end;
the support includes a recess embodied to accommodate the second projection, the recess having a floor;
a portion of the base excluding the first projection and second projection seats on a shoulder of the support adjacent the recess; and
the pedestal and the support are connected via a joint between the second free end and the floor of the recess.

19. The pressure measuring system of claim 1, wherein the pedestal is composed of stainless steel, Invar® nickel-iron alloy, Kovar® nickel-cobalt ferrous alloy, silicon carbide, borosilicate glass or a ceramic, including aluminum oxide, silicon nitride or aluminum nitride.

20. The pressure measuring system of claim 1, wherein the pedestal is composed of a material that has a coefficient of thermal expansion matched to the coefficient of thermal expansion of the pressure sensor.

21. The pressure measuring system of claim 1, wherein the pressure measuring system is a pressure difference, absolute or relative pressure measuring system adapted to measure pressures greater than or equal to 40 bar, and wherein the pedestal is composed of a material having a modulus of elasticity of greater than or equal to 200,000 MPa.

* * * * *